United States Patent [19]

Gotoh et al.

[11] Patent Number: 5,073,243

[45] Date of Patent: Dec. 17, 1991

[54] METHOD FOR PRODUCING AN OPTICAL RECORDING MEDIUM

[75] Inventors: Akira Gotoh, Toride; Yukinobu Yamazaki, Ibaragi; Naoyuki Kikuchi, Toride; Shinkichi Horigome, Tachikawa; Motoyasu Terao, Tokyo; Horoyuki Suzuki, Ibaragi; Makoto Kitoh; Yuichi Kokaku, both of Yokohama; Mitsuru Shimizu, Toride, all of Japan

[73] Assignees: Hitachi Maxwell, Ltd, Osaka; Hitachi, Ltd, Tokyo, both of Japan

[21] Appl. No.: 459,243

[22] Filed: Dec. 29, 1989

Related U.S. Application Data

[60] Division of Ser. No. 246,925, Sep. 19, 1988, Pat. No. 4,908,250, which is a continuation of Ser. No. 939,719, Dec. 9, 1986, abandoned.

[30] Foreign Application Priority Data

| Dec. 9, 1985 | [JP] | Japan | 60-275112 |
| Feb. 19, 1986 | [JP] | Japan | 61-32977 |
| Mar. 19, 1986 | [JP] | Japan | 61-59434 |
| Mar. 19, 1986 | [JP] | Japan | 61-59437 |

[51] Int. Cl.$^5$ ............................................. C23C 14/34
[52] U.S. Cl. ............................... 204/192.26; 204/192.15; 204/192.27
[58] Field of Search ................. 204/192.15, 192.26, 204/192.27

[56] References Cited

U.S. PATENT DOCUMENTS

| 4,268,840 | 5/1981 | Schark et al. | 428/324 |
| 4,663,008 | 5/1987 | Takeoka et al. | 204/192.26 |
| 4,735,698 | 4/1988 | Nomura et al. | 204/192.2 |

OTHER PUBLICATIONS

J. J. Bessot, New Vacuum Deposition Techniques, Metal Finishing, Mar. 1980, pp. 21–26.
J. J. Bessot, New Vacuum Deposition Techniques, Metal Finishing, Apr. 1980, pp. 63–69.

*Primary Examiner*—John Niebling
*Assistant Examiner*—William T. Leader
*Attorney, Agent, or Firm*—Birch, Stewart, Kolasch & Birch

[57] ABSTRACT

An optical recording medium is made by sputtering a polymeric material in an evacuated chamber to form an under layer on a substrate having a preformed grooved pattern of prepits and pregrooves, and then forming a recording layer on the underlayer in the chamber continuously after forming the underlayer. Said under layer is made of a high polymeric material which can be melted, sublimated, or decomposed at a lower temperature than the melting point, the sublimating point, or the decomposing temperature of said recording layer. Accordingly, said under layer can relax the thermal shock transferred from said substrate into said recording layer, and the deformation of said substrate can be prevented, even though a laser beam for playback is repeatedly radiated onto said recording layer, and said optical recording medium has a larger recording sensitivity than the recording sensitivity of an optical recording disc of a prior art.

15 Claims, 5 Drawing Sheets

METHOD FOR PRODUCING AN OPTICAL RECORDING MEDIUM

This application is a divisional of copending application Ser. No. 07/246,925 filed on Sept. 19, 1988, now U.S. Pat. No. 4,908,250, which was a continuation application of Ser. No. 06/939,719 filed on Dec. 9, 1986, which was abandoned.

BACKGROUND OF THE INVENTION

1. Field of the Invention

The present invention relates to an optical recording medium for recording and playing back an information signal by radiating a light beam thereon and a method of the production thereof.

2. Description of the Prior Art

Figure 1:
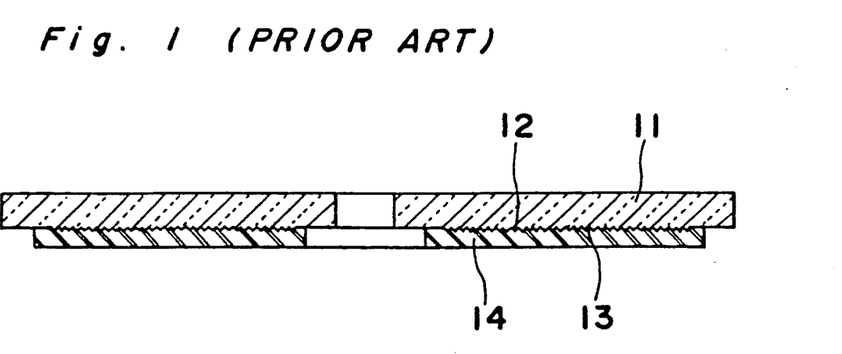
FIG. 1 is a cross sectional view of a single sided optical recording disc of the prior art.
Figure 2:
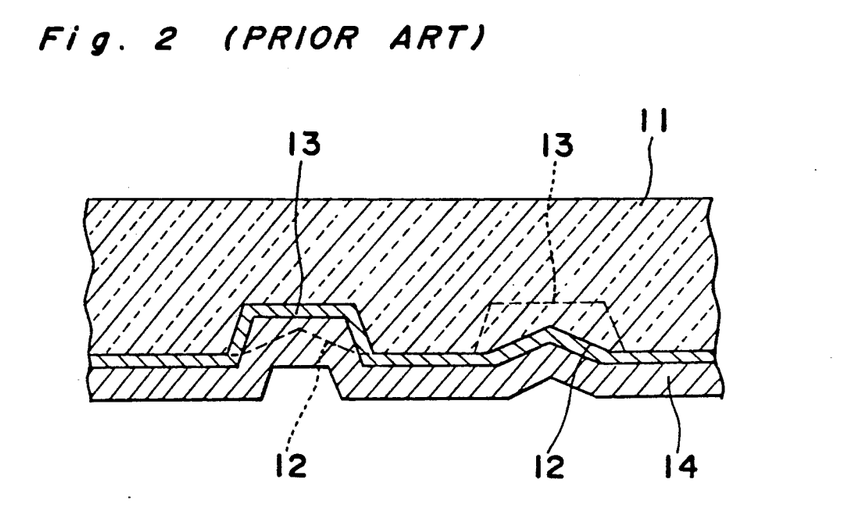
FIG. 2 is enlarged cross sectional view of the center portion of the single sided optical recording disc of FIG. 1.

FIG. 1 shows one example of a conventional single sided optical recording disc, and FIG. 2 is an enlarged cross sectional view of the center portion thereof. In FIGS. 1 and 2, pregrooves 12 corresponding to a tracking signal and prepits 13 corresponding to an address signal are transferred onto one surface of a disc substrate 11 of the optical recording medium, and a recording layer 14 made of a recording material for the heat mode is formed on the transferred surface where the pregrooves 12 and the prepits 13 are formed. The prepits 13 are formed on the pregrooves 12, and each of the information signals corresponding to the difference between the depths of the prepits 13 and the pregrooves 12 is read out.

In the case that an information signal is recorded in the recording layer 14 of the optical recording disc, the following process is performed. First of all, a laser beam for tracking is radiated from the side of the disc substrate 11 along the pregrooves 12 and the prepits 13, and the tracking information signal and the address information signal are detected by a receiver in a recording and playback device for detecting the light reflected on the recording layer 14. Next, a laser beam modulated by the predetermined information signal is radiated onto the predetermined track and the predetermined sector, so that thermal deformation such as melting, evaporation, sublimation, and contraction occurs in the recording layer 14, resulting in the formation of pits designating the information signal in the recording layer 14. On the other hand, in the case that the information signal recorded in the recording layer 14 of the optical recording disc is read out, the laser beam is radiated from the side of the disc substrate 11 along the pregrooves 12, and the tracking information signal and address information signal are detected by detecting the light reflected on the recording layer 14, resulting in the effect that the information signal recorded in the recording layer 14 can be detected.

Recently, a high polymeric material such as polymethylmethacrylate (referred to hereinafter as PMMA), polycarbonate (referred to hereinafter as PC), epoxy resin, etc. formed by injection molding is widely used as the disc substrate 11 provided for this kind of optical recording disc, because the inexpensive high polymeric material can be produced with a high productivity, this material is relatively light, not easily damaged, and the material can be transferred and dealt with easily.

Accordingly, since the high polymeric material has a relatively low heat resistance, the shapes of the pregrooves 12 and the prepits 13 transferred onto the disc substrate 11 may gradually change after the laser beam for playback is repeatedly radiated onto the recording layer 14, and problems develope, such as the contrast between the reflected light decreases and the carrier to noise level ratio (referred to hereinafter as the CN ratio) decreases.

Conventionally, in order to prevent the thermal deformation of the disc substrate 11 made of the high polymeric material during recording of the information signal, to prevent the projection of the disc substrate 11 around the portion where the recording pits are formed and the deformation of the pits formed by the projection of the disc substrate 11, and to record an information signal at a high CN ratio, an information recording medium comprising an adiabatic layer with a transparency between the disc substrate 11 and the recording layer 14 is publicly known (Japanese patent laid open No. 189356/1982), wherein the adiabatic layer is made of a transparent material having a high heat resistance such that the material cannot be deformed at a higher temperature than the temperature of the recording layer 14 when recording, and having a low heat conductivity and adiabatic effect. For example, the material is made of $CuSe$ and $As_2Se_3$, etc. including one of Se and S at a larger atomic percentage than 40 atomic percentage.

As the other examples, ultraviolet curing resin (Japanese patent laid open No. 86756/1978) and cellulose nitrate (Japanese patent laid open No. 55544/1982) are known. In the forming method of the layer made of the ultraviolet curing resin or the cellulose nitrate, either the rotating and coating method or the vacuum evaporation method is normally used. In this case, a thin layer made of Te is used as the material of the recording layer 14, and an organic compound such as ultraviolet curing resin, cellulose nitrate, etc. which can be coated by the rotating and coating method is used as an under layer arranged under the recording layer 14.

According to present research, the characteristic of the heat resistance of the under layer formed under the recording layer 14 remarkably influences the recording sensitivity of the recording layer 14, and it has been found that the thermal deformation of the recording layer 14 is facilitated by the thermal deformation of the under layer such that in the case of the disc substrate 11 the recording sensitivity of the recording layer 14 remarkably decreases when the thermal deformation does not occur at all. For example, in the case that the recording layer 14 is formed on the disc substrate 11 made of glass, the recording sensitivity remarkably decreases as compared that in the case when the recording layer 14 is formed on the disc substrate 11 made of PMMA. Accordingly, as the aforementioned known example, when an adiabatic layer wherein thermal deformation does not occur at all at a recording temperature is formed between the disc substrate 11 and the recording layer 14, thermal deformation of the disc substrate 11 can be prevented and the decrease of the CN ratio can be prevented. However, the recording sensitivity remarkably decreases, and there is a problem that the laser power must be increased.

For example, in the case when a ultraviolet curing resin is used as the under layer, there is a problem that the recording sensitivity decreases. On the other hand, in the case that cellulose nitrate is used as the under layer, the recording sensitivity does not decrease, however, it is necessary to perform the troublesome rotating and coating process with a relatively low productivity, and it is difficult to form the under layer made of cellulose nitrate at a uniform thickness. Moreover, recently the forming method of the recording layer made of Te widely used is the sputtering method, therefore, the rotating and coating method is not a desirable method.

SUMMARY OF THE INVENTION

An essential object of the present invention is to provide an optical recording medium and the production method thereof with a relatively high productivity, the optical recording medium having a substrate not deformable and having a larger recording sensitivity than the optical recording disc of the prior art, even though a laser beam for playback is repeatedly radiated onto a recording layer.

According to the present invention, there is provided an optical recording medium comprising a substrate having an uneven pattern on one surface of the substrate, a recording layer made of a material which can be melted, sublimated, or decomposed at a specified temperature, and an under layer formed between the uneven pattern of the substrate and the recording layer, the under layer being made of a high polymeric material which can be melted, sublimated, or decomposed at a lower temperature than the melting point, the sublimating point, or the decomposing temperature of the recording layer.

Moreover, according to the present invention, there is provided a production method of an optical recording medium comprising a process of forming an under layer on an uneven pattern of a substrate at a predetermined vacuum condition in a tank, and forming a recording layer on the under layer in the predetermined vacuum condition in the tank continuously after the process of forming the under layer.

Accordingly, the under layer can relax the thermal shock transferred from the substrate to the recording layer, and the deformation of the substrate can be prevented, even though a laser beam for playback is repeatedly radiated onto the recording layer, and the optical recording medium has a larger recording sensitivity than the recording sensitivity of the optical recording medium of the prior art. Therefore, even though the output power of the laser beam for playback is relatively small, the information signal recorded in the recording layer can be read out properly.

Moreover, since the production method of the optical recording medium does not comprise the rotating and coating method and comprises only the sputtering process, productivity can be improved, resulting in that the cost of the production can be reduced.

DETAILED DESCRIPTION OF THE INVENTION

Figure 3:
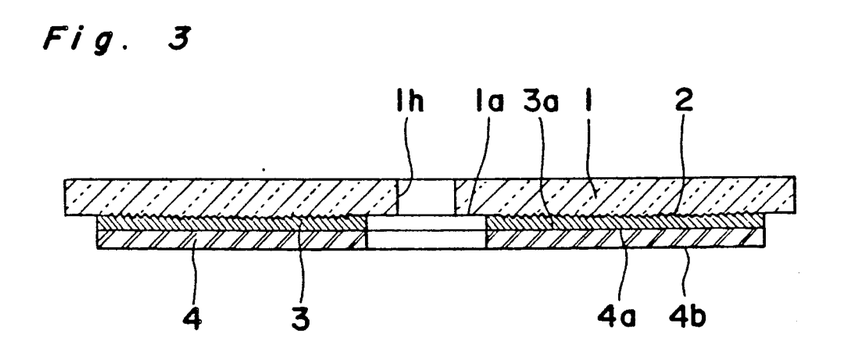
FIG. 3 is a cross sectional view of a single sided optical recording disc with an under layer according to the present invention.

FIG. 3 shows a direct read of a write type and single sided type optical recording disc of a first preferred embodiment according to the present invention. In FIG. 3, a center hole 1h is formed in disc substrate 1 for inserting a spindle of a recording and playback device in the center portion of the disc substrate 1, and an uneven pattern 2 is formed on the bottom surface 1a of the disc substrate 1. An under layer 3 is formed on the uneven pattern 2 of the disc substrate 1, and a recording layer 4 is formed on the under layer 3, wherein the bottom surface 3a of the under layer 3 is made uneven or even, each of the top and the bottom surfaces 4a and 4b is made uneven or even, and the under layer 3 is provided for relaxing the thermal shock from the recording layer 4 into the disc substrate 1 when a laser beam is repeatedly radiated from the side of the upper surface of the disc substrate 1 onto the recording layer 4 and playing back the information signal, and the heat occurred in the recording layer 4 by the laser beam is transferred through the under layer 3 into the disc substrate 1.

Figure 4:
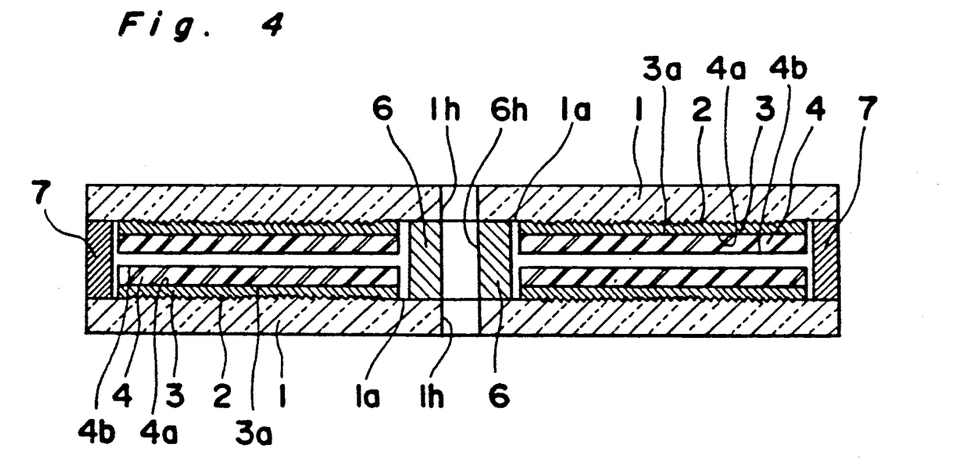
FIG. 4 is a cross sectional view of a dual sided optical recording disc with an under layer according to the present invention.

FIG. 4 shows a dual sided optical recording disc of a second preferred embodiment according to the present invention. In FIG. 4, a pair of single sided optical recording discs of FIG. 3 are bonded together through an inner spacers 6 and an outer spacers 7 so that the recording layers 4 face each other, wherein the inner spacers 6 are bonded on the inner rim portion of the disc substrate 1, and a center hole 6h having the same inner diameter as the inner diameter of the center hole 1h is formed in the center portion of the inner spacers 6. Moreover, the single sided optical recording disc of FIG. 3 and an enforcement member in the same shape as the disc substrate 1 may be bonded together through the inner spacers 6 and the outer spacers 7 so that the recording layers 4 face each other.

In FIGS. 3 and 4, the disc substrate 1 is made of a plastic resin material such as PMMA, PC, polyvinyl chloride, polypropylene, acrylic resin, epoxy resin etc.

The uneven pattern 2 is formed on the bottom surface 1a of the disc substrate 1 by a known method such as the photo polymerization method (referred to hereinafter as the 2P method), the injection method, the compression method, or the injection-compression method.

The recording layer 4 is made of a recording material for the heat mode of one or more elements selected from a group consisting of S, Se, Te, Bi, Sn, Pb, In, Zn, Mg, Au, Ce, Ca, Sb, Rh, Mn, and Al, the recording layer 4 may be formed by a thin film forming method, such as the sputtering method, etc. As described above, each of the top and bottom surfaces 4a and 4b is made uneven with recording an information signal or even without recording an information signal.

The under layer 3 is made of thermal decomposing high polymeric material having good transparency, which can be decomposed by heating at a lower temperature than the melting point of the recording layer 4 and producing a gas. Concretely, the material of the under layer 3 is at least one compound selected from the group consisting of polyolefin fluoride, halogenide of polyolefin fluoride, and graphite fluoride, and is a material which melts, sublimates and decomposes at a lower second temperature than the first temperature at which the material of the recording layer 4 can be melted, sublimated, or decomposed. For example, in the optical recording medium comprising the disc substrate 1 made of PMMA, PC or epoxy resin, and the recording layer 4 made of an alloy having a relative low melting point and mainly including Te, in particular, the under layer 3 is preferably made of one or more high polymeric materials having a low melting point selected from a group consisting of polyolefin fluoride such as polytetrafluoroethylene, polyvinyl fluoride, polytrifluoroethylene, polyvinylidene fluoride, polyhexafluoropropylene, halogenide of polyolefine fluoride such as polychlorotrifluoroethylene, polydichlorodifluoroethylene, graphite fluoride, such as polycarbon monofluoride, polydicarbon monofluoride, etc., or the modified product of these compounds. The under layer 3 is formed by the sputtering method, as well as the forming method of the recording layer 4. As described above, the bottom surface 3a of the under layer 3 is made uneven with the forming of the prepits and the pregrooves, or even without forming the prepits and the pregrooves.

PREFERRED EMBODIMENTS

Next is one example of the production method of the direct read-after-write type optical recording disc according to the present invention.

First of all, the disc substrate 1, a material for forming the under layer 3 and a material for forming the recording layer 4 are placed in a vacuum tank. Next, after the inside of the vacuum tank is made vacuous into the predetermined degree of vacuum, inert gas is supplied into the vacuum tank, and the gas pressure in the inside of the vacuum tank is adjusted to a predetermined pressure value. After that, on the condition of the adjusted gas pressure, the under layer 3 is formed on one surface 1a of the disc substrate 1 by the sputtering method using the material for forming the under layer 3 as a target, and under the same condition of the gas pressure, the recording layer 4 is formed on the surface of the under layer 3 by the sputtering method using the material for forming the recording layer 4 as a target.

MEASUREMENT METHOD OF RECORDING SENSITIVITY

Before the description of the experimental examples proceeds, the measurement method of the recording sensitivity of the recording layer 4 will be described below in details. The laser beam having a wave length of 830 nm and a pulse width of 100 nsec oscillated by a light generator is radiated from the side of the top surface of the disc substrate 1 through the under layer 3 onto the recording layer 4 so that the laser beam is focused on the recording layer 4. Then, when the output power of the laser beam is increased, the power of the laser beam supplied onto the recording layer 4 (referred to hereinafter as the recording power) is increased, and a pit begins to be formed when the recording power is larger than a predetermined threshold power level, wherein the pit designates a digital information signal depend on whether the pit in a predetermined is formed or not. A modulation factor mf is referred to hereinafter as the corresponding value to the size of the pit formed in the recording layer 4 when a predetermined recording power is supplied onto the recording layer 4. That is, the modulation factor mf (percentage) is defined by the following equation.

$$mf = (A-X)/(A-B) \text{ (percentage)} \quad (1)$$

In the above equation (1), A is a reflection factor of the laser beam on the portion where the recording layer 4 is formed and the pit is not formed, B is a reflection factor of the laser beam on the portion where the recording layer 4 is not formed, and X is a reflection factor of the laser beam on the portion where the pit is formed by radiating the laser beam having a predetermined recording power.

As shown in the equation (1), the modulation factor mf is defined as the ratio of the reflection factor of the laser beam when the pit is formed to the reflection factor of the laser beam when the pit is not formed. In the measurement of the modulation factor mf, it is judged by the known scanning electron microscope observation method whether or not the pit having a predetermined shape is formed properly.

ACCELERATED TEST

In the accelerated test of the life of the pit, the inside of the tank where the optical recording disc comprising the recording layer 4 is arranged is maintained on the condition of a temperature of 60° C. and a relative humidity of 95 percentages, it is measured whether or not a crack is formed in the recording layer 4 and whether or not the reflection factor of the laser light decreases by the oxidation reaction is smaller than a predetermined threshold value of the reflection factor, wherein the predetermined threshold value of the reflection factor is defined as the maximum value of the reflection factor when the laser light reflected on the recording layer 4 can not be received by the receiver in the recording and playback device.

EXPERIMENTAL EXAMPLE 1

A disc substrate 1 made of polycarbonate having a diameter of 5 inches and a thickness of 1.2 mm was made by the injection molding method, wherein the reterdation of the disc substrate 1 was smaller than 20 nm on the go and return paths. The formed disc substrate 1 was set in the sputtering device, and the under layer 3 made of fluorocarbon polymers was formed on one surface 1a of the disc substrate 1 as follows. That is, a Teflon film made by Du Pont-Toray Co., Ltd. was used as a target, the under layer 3 was formed on the condition of an Ar gas pressure of 30 mTorr and a radio frequency output power of the laser beam of 200 W, resulting in that the under layer 3 having a thickness of approximately 30 nm was formed on the surface 1a of the disc substrate 1. Following to the formation of the under layer 3, the recording layer 4 of Te-Se-Pb having a thickness of approximately 27 nm was formed by the radio frequency sputtering method.

Figure 7:
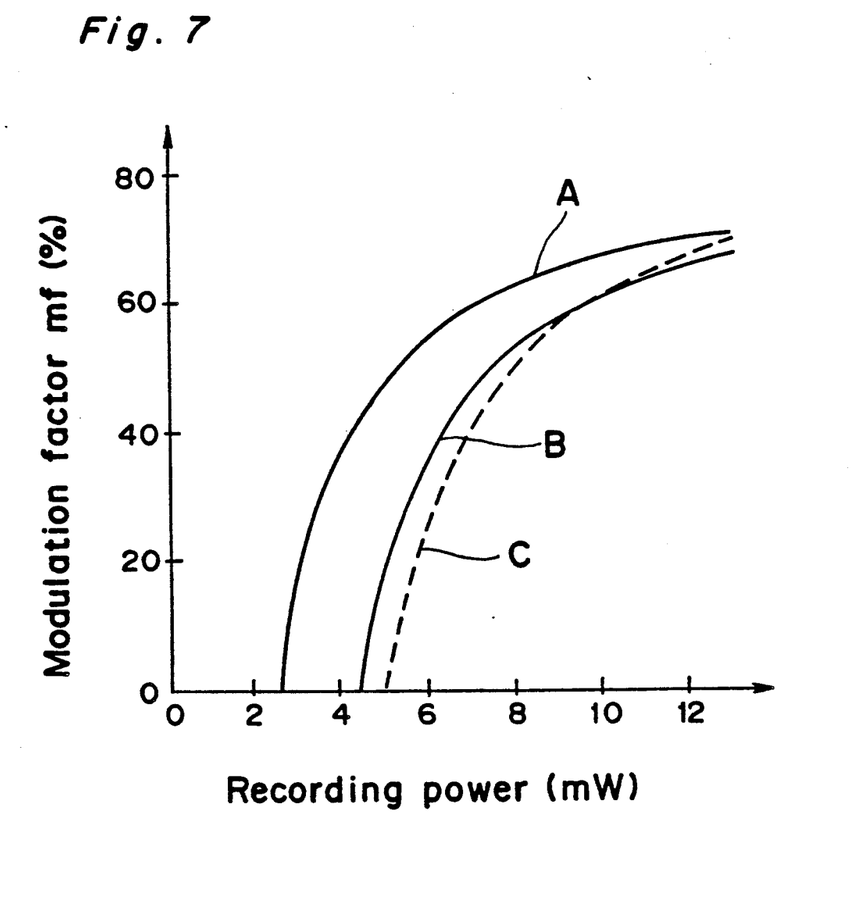
FIG. 7 is a graph of the modulation factor (mf) to the recording power of optical recording discs with an under layer of experimental examples 1 and 2 according to the present invention and an optical recording disc with an under layer made of cellulose nitrite of a comparative example.

FIG. 7 shows a measurement result of the modulation factor mf (percentage) to the recording power (mW) of the optical recording disc comprising the under layer 3 made of fluorocarbon polymers and cellulose nitrate. In FIG. 7, A designates the characteristic of the optical recording disc comprising the under layer 3 made of fluorocarbon polymers, and C designates the characteristic of optical recording disc comprising the under layer 3 made of cellulose nitrate. According to the measurement result of FIG. 7, the modulation factor mf in the case A of the under layer 3 made of fluorocarbon polymers was larger than the modulation factor mf in the case C of the under layer 3 made of cellulose nitrate at any recording power. In the case of the under layer 3 of fluorocarbon polymers, the projection around the pit was formed uniformly and properly.

Next, after the under layer 3 made of ultraviolet curing resin of acrylic resin group having a pattern of the prepits and pregrooves for tracking was formed on the disc substrate 1 made of glass or epoxy resin, the recording layer 4 made of Te-Se-Pb was formed on the under layer 3 by the aforementioned radio frequency sputtering method. In this case, the modulation factor mf had the same characteristic as the characteristic in the case of the under layer 3 made of fluorocarbon polymers.

The aforementioned accelerated test of each of the optical recording disc comprising the under layer 3 made of fluorocarbon polymers and the optical recording disc comprising the under layer 3 made of ultraviolet curing resin was performed for more than 3 months on the condition of a temperature of 60° C. and a relative humidity of 95 percentages. According to the measurement result of the accelerated test, any crack was not formed in the recording layer 4 of the optical recording discs, and the reflection factor of the laser light was not smaller than the aforementioned predetermined threshold value of the reflection factor.

EXPERIMENTAL EXAMPLE 2

A disc substrate 1 made of polycarbonate having a diameter of 5 inches and a thickness of 1.2 mm was made by the injection molding method, wherein the reterdation of the disc substrate 1 was smaller than 20 nm on the go and return paths. The formed disc substrate 1 was set in the sputtering device, and the under layer 3 made of polyimide was formed on one surface 1a of the disc substrate 1 as follows. That is, a Kapton film made by Du Pont-Toray Co., Ltd. was used as a target, the under layer 3 was formed on the condition of an Ar gas pressure of 30 mTorr and a radio frequency output power of the laser beam of 200 W, resulting in that the under layer 3 having a thickness of approximately 30 nm was obtained. Following to the formation of the under layer 3, the recording layer 4 of Te-Se-Pb having a thickness of approximately 27 nm was formed by the radio frequency sputtering method.

FIG. 7 shows a measurement result of the modulation factor mf (percentage) to the recording power (mW) of the optical recording disc comprising the under layer 3 made of polyimide. In FIG. 7, B designates the characteristic of the optical recording disc comprising the under layer 3 made of polyimide. According to the measurement result of FIG. 7, the modulation factor mf in the case B of the under layer 3 made of polyimide is smaller than the modulation factor mf in the case A of the under layer 3 made of fluorocarbon polymers at any recording power, however, the modulation factor mf in the case B of the under layer 3 made of polyimide is larger than the modulation factor mf in the case C of the under layer 3 made of cellulose nitrate at a larger recording power than approximately 10 mW.

The aforementioned accelerated test of the optical recording disc comprising the under layer 3 made of polyimide was performed for more than 3 months on the condition of a temperature of 60° C. and a relative humidity of 95 percentages. According to the measurement result of the accelerated test, any crack was not formed in the recording layer 4 of the optical recording discs, and the reflection factor of the laser light was not smaller than the aforementioned predetermined threshold value of the reflection factor.

Figure 5:
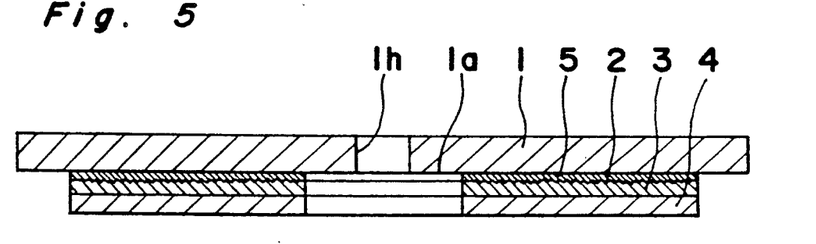
FIG. 5 is a cross sectional view of a single sided optical recording disc with an under layer and a replica layer according to the present invention.
Figure 6:
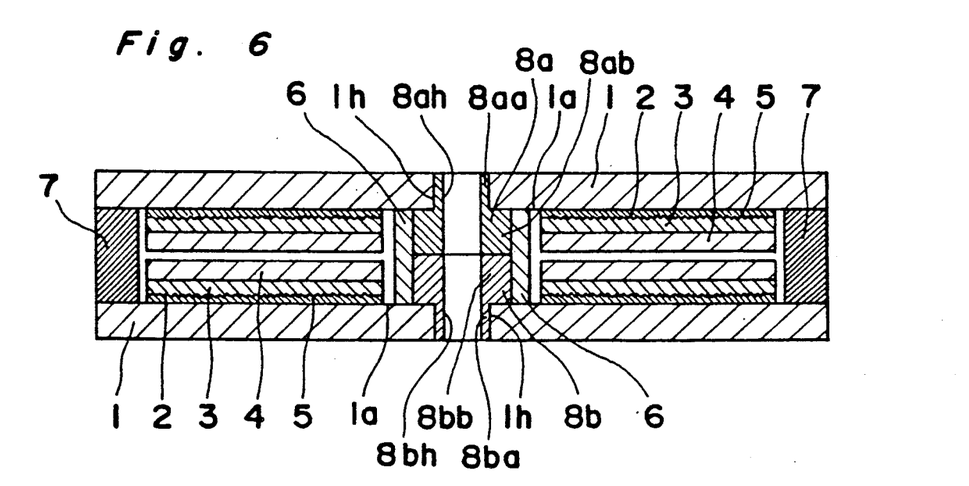
FIG. 6 is a cross sectional view of a dual sided optical recording disc with an under layer and a replica layer according to the present invention.

Moreover, as shown in FIG. 5, a replica layer 5 made of ultraviolet curing resin including the uneven pattern 2 was formed by the 2P method between the disc substrate 1 made of glass or epoxy resin and the under layer 3. In general, two cases are known for tracking serve method, one case is that the uneven pattern 2 is formed between the under layer 3 and the recording layer 4, on the other hand, another case is that the uneven pattern 2 is not formed, and FIGS. 5 and 6 show the latter case. The aforementioned measurement of the modulation factor mf and the aforementioned accelerated test of the optical recording disc of FIG. 5 were formed. According to the measurement, the same characteristic of the modulation factor mf was obtained as the characteristic of the modulation factor mf of the optical recording disc and the accelerated test, and according to the accelerated test, any crack was not formed in the recording layer 4 of the optical recording discs, and the reflection factor of the laser light was not smaller than the aforementioned predetermined threshold value of the reflection factor.

Furthermore, as shown in FIG. 6, a pair of the single sided optical recording discs with the under layer 3 and the replica layer 5 of FIG. 5 may be bonded together through a pair of hub halves 8a and 8b, the inner spacer 6 and the outer spacer 7 so that the recording layers 4 of each of the optical recording discs face each other. The hub halves 8a is in the same shape of the hub halves 8b, and center holes 8ah and 8bh for inserting a spindle of a recording and playback device are respectively formed in the center portion of the hub halves 8a and 8b. The hub halves 8a comprises a first cylindrical portion 8aa and a second cylindrical portion 8ab, wherein the portions 8aa and 8ab have the same inner diameter, and the portion 8aa has a smaller outer diameter than the outer diameter of the portion 8ab. The hub halves 8b has a first cylindrical portion 8ba and a second cylindrical portion 8bb as well as the hub halves 8a. As shown in FIG. 6, the first cylindrical portions 8aa and 8ba are respectively inserted into the center holes 1h of the disc substrates 1, and a pair of hub halves 8a and 8b are bonded together on the bottom surface of the second cylindrical portion 8ab and 8bb thereof.

Moreover, the single sided optical recording disc of FIG. 5 and the aforementioned enforcement member may be bonded together through the hub haves 8a and 8b, the inner spacer 6 and the outer spacer 7.

The under layer 3 is made of the transparent material having a heat resistance superior than the disc substrate 1 and having a lower melting point, a lower decomposing temperature, and a lower heat conductivity than the recording layer 4, resulting in that the under layer 3 can relax the thermal shock transferred from the recording layer 4 through the under layer 3 into the disc substrate 1. In the case that the SN ratio including the noise of the optical system in a recording and playback device for the optical recording disc is taken account into the design of the device, the output power of the laser beam for playback is preferably larger. In case a semiconductor laser of a wavelength of 830 nm is used, the laser beam having a larger output power than 1 mW is required. In order not to occur the thermal deformation of the disc substrate 1 even though the laser beam for playback having a larger output power than 1 mW is repeatedly radiated onto the the recording layer 4, it is necessary to form the under layer 3 having a heat resistance being proof at a higher temperature than 110° C. On the other hand, when the under layer 3 has a lower heat conductivity, the recording sensitivity corresponding to the modulation factor mf can be improved. For example, in practical use, the under layer 3 having a smaller heat conductivity than 5 W/mK is required.

Concretely, in the case that the disc substrate 1 is made of PMMA, PC, or epoxy resin, the recording layer 4 is made of a metal having a low melting point mainly including Te, the under layer 3 is preferably made of polytetrafluoroethylene.

Table 1 shows materials of the disc substrate 1, the recording layer 4, and the under layer 3 applicable to the optical recording disc according to the present invention, and also shows the melting point, the decomposing temperature, and the heat conductivity of those materials.

EXPERIMENTAL EXAMPLES 3 TO 7

After the under layer 3 made of polytetrafluoroethylene was formed by the sputtering method on one surface 1a of the disc substrate 1 made of PC by the injection molding method, the recording layer 4 made of an alloy of TeSe group having a thickness of 300 Å was formed on the under layer 3 by the sputtering method, wherein the under layer 3 was formed on the sputtering condition of an Ar gas pressure of $7 \times 10^{-1}$ Pa and a radio frequency output power of 60 W, and the recording layer 4 was formed on the sputtering condition of an Ar gas pressure of $6 \times 10^{-1}$ Pa and a radio frequency output power of 40 W. The 5 optical recording discs respectively comprising the under layer 3 having 5 sorts of the thicknesses of 50 Å, 100 Å, 200 Å, 400 Å and 800 Å were formed by the aforementioned method, wherein each of the 5 optical recording discs is respectively referred to hereinafter as the experimental examples 3 to 7.

Table 2 shows the measurement result of the maximum output power of the laser beam when the the detected signal changes in the range of +10 percentages to −10 percentages of the signal level (referred to hereinafter as the maximum output power of the laser beam) in the 5 optical recording discs comprising the under layer 3 having 5 sorts of the thicknesses. In the measurement of the maximum output power of the laser beam, after the laser beam having a wavelength of 830 nm was repeatedly radiated onto the recording layer 4 at a repeat cycle of 1200/min. for 10 hours, the information signal recorded in the recording layer 4 was read out, and the maximum output power of the laser beam when the the detected signal changes in the range of +10 percentages to −10 percentages of the signal level was measured. In Table 2, the measurement result of the maximum output power of the laser beam in the case of the optical recording disc without the under layer 3 is also shown as the comparative example.

This measurement was performed for the following reason. That is, when the laser beam having a large output power is radiated through the disc substrate 1, the under layer 3 onto the recording layer 4, and the uneven pattern 2 is deformed by the deformation of the disc substrate 1, the light beam radiated onto the recording layer 4 may be not reflected properly, resulting in that the information signal included in the reflected laser beam may not be detected properly by the receiver in the recording and playback device. Therefore, even though a larger output power of the laser beam is radiated onto the recording layers 4, the maximum output power of the laser beam, when the uneven pattern 2 is not deformed and a predetermined variation of the detected signal can be obtained, is required.

As shown in Table 2, the maximum output power of the laser beam of each of the 4 optical recording discs comprising the under layer 3 except for the experimental example 3 was larger than the maximum output power of the laser beam of the comparative example of the optical recording disc without the under layer 3, and when the optical recording disc had the thicker under layer 3, the maximum output power of the laser beam increases, resulting in that the effect for preventing the deformation of the uneven pattern 2 could be improved.

According to the comparison of the measurement of the maximum output power of the laser beam in the experimental examples 3 to 7 in Table 2, when the optical recording disc had the thicker under layer 3, the effect for relaxing the thermal shock into the disc substrate 1 could be improved. Moreover, in order to improve the SN ratio of the detected signal, the output power of the laser beam is preferably large, and the output power of the laser beam is preferably larger than 1 mW. For this reason, in the case that the under layer 3 is made of polytetrafluoroethylene, the under layer 3 having a larger thickness than 200 Å is preferably formed.

Figure 8:
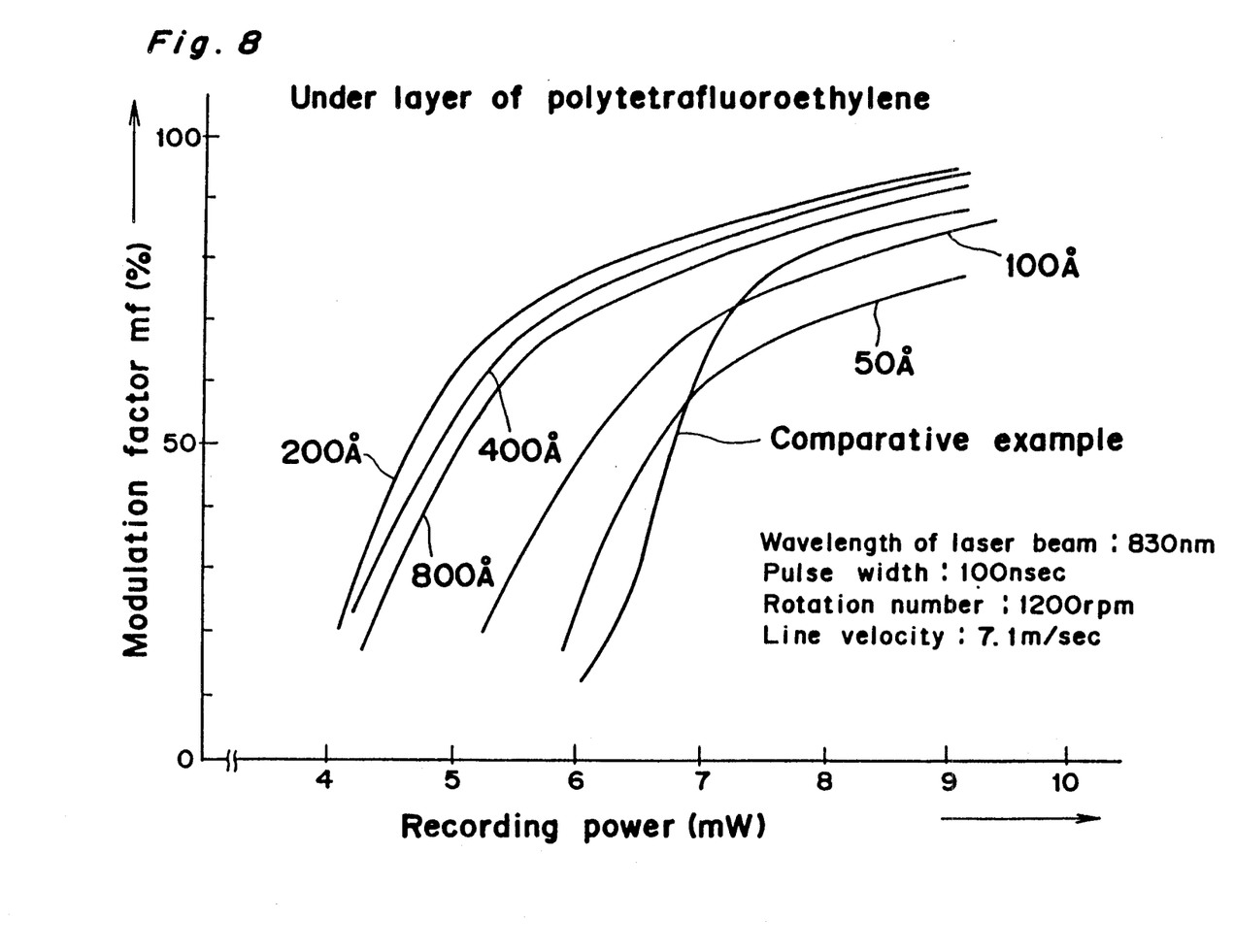
FIG. 8 is a graph of the modulation factor (mf) to the recording power of optical recording discs with an under layer made of polytetrafluoroethylene of experimental examples 3 and 7 according to the present invention and an optical recording disc without the under layer of a comparative example.

FIG. 8 shows the measurement result of the modulation factor mf (percentage) to the recording power (mW) of the 5 optical recording discs with the under layer 3 of the aforementioned experimental examples 3 to 7 and the optical recording disc without the under layer 3 of the aforementioned comparative example. In the measurement of the modulation factor mf, the wavelength of the laser beam was 830 nm, the pulse width was 100 nsec, the optical recording disc was driven to rotate at a rotation speed of 1200 rpm, the line velocity on the rotating optical recording disc was 7.1 m/sec.

As shown in FIG. 8, the modulation factor mf of each of the optical recording discs with the under layer 3 of the experimental examples 3 to 7 was larger than the modulation factor mf of the optical recording disc without the under layer 3 of the comparative example at a smaller recording power than approximately 6.8 mW, therefore, it was understood that the pit could be easily formed in the recording layer 4 of the optical recording discs with the under layer 3. In particular, in the experimental examples 3 to 7, the 3 optical recording discs with the under layer 3 having a larger thickness than 200 Å, corresponding to the experimental examples 5 to 7, were superior in the modulation factor mf than the other experimental examples 3 to 4 and the comparative example. Moreover, as shown in FIG. 8, the ratio of the modulation factor mf to the recording power at a lower recording power was larger than the ratio at a higher recording power. In this sort of normal optical recording and playback device, the laser beam having an output power of 20 mW (corresponding to the recording power of 6 mW to 8 mW) is widely used, therefore, in particular, the optical recording discs of the experimental examples 5 to 7 are effective in using as the optical recording disc in the optical recording and playback device.

EXPERIMENTAL EXAMPLE 8

As shown in FIG. 5, a replica layer 5 made of ultraviolet curing resin was coated on the bottom surface 1a of the disc substrate 1 made of glass, the replica layer 5 was expanded by the known method, and the pregrooves corresponding to the tracking information signal and the prepits corresponding to the address information were transferred onto the bottom surface of the replica layer 5. Next, after a under layer 3 made of polychlorotrifluoroethylene having a thickness of approximately 200 Å was formed on the replica layer 5 by the radio frequency sputtering method, a recording layer 4 made of Te-Se group having a thickness of approximately 300 Å was formed on the under layer 3 by the radio frequency sputtering method. The optical recording disc with the replica layer 5 and the under layer 3 of polychlorotrifluoroethylene is referred to hereinafter as the experimental example 8.

EXPERIMENTAL EXAMPLE 9

As well as the experimental example 8, the replica layer 5 made of ultraviolet curing resin where the pregrooves and the prepits were transferred was formed on the bottom surface 1a of the disc substrate 1. Then, after a layer 3 made of polycarbon monofluoride having a thickness of approximately 200 Å was formed on the replica layer 5 by the radio frequency sputtering method, a recording layer 4 made of Te-Se group having a thickness of approximately 300 Å was formed on the under layer 3 by the radio frequency sputtering method. The optical recording disc with the replica layer 5 and the under layer 3 of polycarbon monofluoride is referred to hereinafter as the experimental example 9.

EXPERIMENTAL EXAMPLE 10

As well as the experimental example 8, the replica layer 5 made of ultraviolet curing resin where the pregrooves and the prepits were transferred was formed on the bottom surface 1a of the disc substrate 1. Then, after a layer 3 made of polyvinylidene fluoride having a thickness of approximately 200 Å was formed on the replica layer 5 by the radio frequency sputtering method, a recording layer 4 made of Te-Se group having a thickness of approximately 300 Å was formed on the under layer 3 by the radio frequency sputtering method. The optical recording disc with the replica layer 5 and the under layer 3 of polyvinylidene fluoride is referred to hereinafter as the experimental example 10.

EXPERIMENTAL EXAMPLE 11

As well as the experimental example 8, the replica layer 5 made of ultraviolet curing resin where the pregrooves and the prepits were transferred was formed on the bottom surface 1a of the disc substrate 1. Then, after a layer 3 made of polyhexafluoropropylene having a thickness of approximately 200 Å was formed on the replica layer 5 by the radio frequency sputtering method, a recording layer 4 made of Te-Se group having a thickness of approximately 300 Å was formed on the under layer 3 by the radio frequency sputtering method. The optical recording disc with the replica layer 5 and the under layer 3 of polyhexafluoropropylene is referred to hereinafter as the experimental example 11.

MEASUREMENT RESULT OF EXPERIMENTAL EXAMPLES 2, 5 AND 8 TO 11

Figure 9:
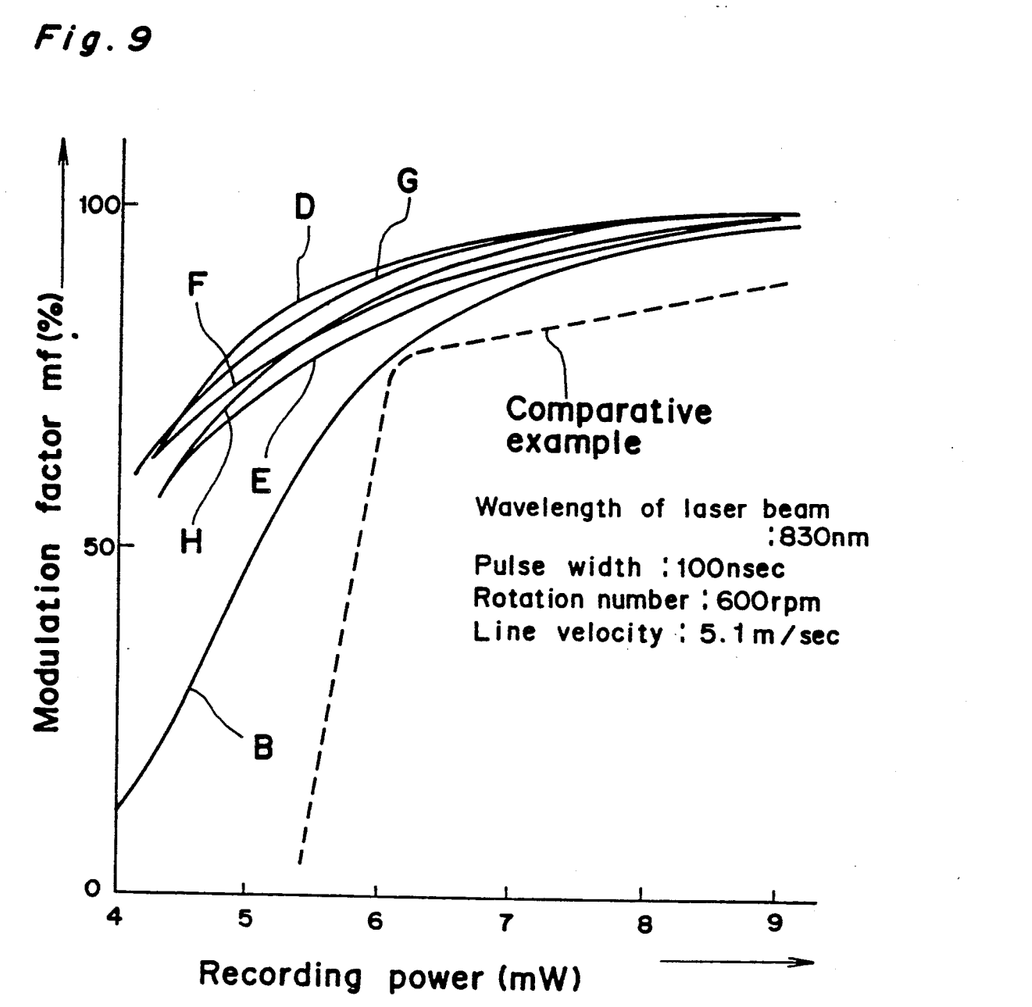
FIG. 9 is a graph of the modulation factor (mf) to the recording power of optical recording discs with an under layer of experimental examples 2, 6 and 8 to 11 according to the present invention and the optical recording disc without the under layer of the comparative example.

FIG. 9 shows the measurement result of the modulation factor mf (percentage) to the recording power (mW) of the 6 optical recording discs with the replica 5 and the under layer 3 of the aforementioned experimental examples 2, 5 and 8 to 11, and the optical recording disc without the under layer 3 of the comparative example.

In FIG. 9, B designates the modulation factor characteristic of the optical recording disc with the under layer 3 made of polyimide of the experimental example 2, D designates the modulation factor characteristic of the optical recording disc with the under layer 3 made of polytetrafluoroethylene of the experimental example 5, E designates the modulation factor characteristic of the optical recording disc with the under layer 3 made of polychlorotrifluoroethylene of the experimental example 8, F designates the modulation factor characteristic of the optical recording disc with the under layer 3 made of polycarbon monofluoride of the experimental example 9, G designates the modulation factor characteristic of the optical recording disc with the under layer 3 made of polyvinylidene fluoride of the experimental example 10, and H designates the modulation factor characteristic of the optical recording disc with the under layer 3 made of polyhexafluoropropylene of the experimental example 11.

In the measurement, the wavelength of the laser beam was 830 nm, the pulse width was 100 nsec, the optical recording disc was driven to rotate at a rotation speed of 600 rpm, the line velocity on the rotating optical recording disc was 5.1 m/sec.

As shown in FIG. 9, the modulation factor mf of each of the optical recording discs with the under layer 3 of the experimental examples 2, 5 and 8 to 11 was larger than the modulation factor mf of the optical recording disc without the under layer 3 of the comparative example at any recording power, therefore, it was understood that the pit can be easily formed in the recording layer 4 of the optical recording discs with the under layer 3. In particular, the modulation characteristic of the optical recording disc with the under layer 3 made of polytetrafluoroethylene was most superior in the experimental examples 2, 5 and 8 to 11. The modulation characteristic of each of the optical recording discs with the under layer 3 was superior in the order of the optical recording disc with the under layer 3 made of polyvinylidene fluoride of the experimental example 10, the optical recording disc with the under layer 3 made of polycarbon monofluoride of the experimental example 9, the optical recording disc with the under layer 3 made of polyhexafluoropropylene of the experimental example 11, and the optical recording disc with the under layer 3 made of polychlorotrifluoroethylene fluoride of the experimental example 8, therefore, the pit can be easily formed in the recording layer 4 in this order.

Moreover, as shown in FIG. 9, the ratio of the modulation factor mf to the recording power at a lower recording power is larger than the ratio at a higher recording power as well as the characteristic of FIG. 6. In this sort of normal optical recording and playback device, the laser beam having an output power of 20 mW (corresponding to the recording power of 6 mW to 8 mW) is widely used, therefore, in particular, the optical recording discs of the experimental examples 5 and 8 to 11 are effective in using as the optical recording disc in the optical recording and playback device.

The subject matter of the present invention is to form the under layer 3 made of a high polymeric material having a lower melting point, a lower composing temperature, and a lower heat conductivity than the recording layer 4, between the disc substrate 1 and the recording layer 4, the material of the under layer 3 is not limited to the aforementioned material of the experimental examples 1 to 11.

TABLE 1

| Material | Melting point or Decomposing temperature (°C.) | Temperature of thermal deformation (°C.) | Heat conductivity (Kcal/mh°C.) |
|---|---|---|---|
| Te | 455 | | 2.74 |
| PMMA | 110 | ≦90 | 0.17 |
| PC | 220 | ≦120 | 0.17 |
| epoxy resin | ≦325 | ≦130 | 0.15 ≦ and ≦1.2 |
| polytetrafluoroethylene | 400 | | 0.28 |

TABLE 2

| Experimental example | Thickness of under layer (Å) | Maximum output power (mW) |
|---|---|---|
| 3 | 50 | 0.8 |
| 4 | 100 | 0.9 |
| 5 | 200 | 1.0 |
| 6 | 400 | 1.1 |
| 7 | 800 | 1.3 |
| comparative example | 0 | 0.8 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A production method of an optical recording medium comprising:
providing a disc substrate having an uneven grooved pattern of prepits and pregrooves preformed on one surface thereof at a predetermined vacuum condition in a chamber;
forming an under layer on said uneven surface pattern by sputtering a polymer material at said predetermined vacuum condition; and
forming a recording layer of material on said under layer under a vacuum condition in said chamber continuously after the forming of said under layer wherein the polymer material has a first temperature at which said material can be melted, sublimated, or decomposed, a heat resistance superior to said disc substrate and a lower heat conductivity than said substrate, and the recording layer material has a second temperature at which said material can be melted, sublimated or decomposed, said first temperature being lower than said second temperature, whereby said under layer relaxes thermal shock transmitted from said recording layer to said disc substrate.

2. The production method of claim 1, wherein in the process of forming said under layer, an inert gas pressure in said chamber is adjusted to a predetermined value to form said predetermined vacuum condition, and said under layer is formed on said uneven grooved pattern of said substrate, using material of said under layer as a target, by a radio frequency sputtering method.

3. The production method of claim 2, wherein the material of said under layer as a target is a material selected from at least one member of the group consisting of a fluorocarbon polymer, polyamide and polyamideimide, and
said inert gas is Ar.

4. The production method of claim 2, wherein said recording layer is continously sputtered on said under layer using material of said recording layer as a target after the process of forming said under layer.

5. The production method of claim 1, wherein said polymeric material is transparent.

6. The production method of claim 1, wherein said polymeric material is at least one compound selected from the group consisting of polytetrafluoroethylene, polyvinyl fluoride, polytrifluoroethylene, polyvinylidene fluoride, polyhexafluoropropylene, polychlorotrifluoroethylene, polydichlorodifluoroethylene, polycarbon monofluoride and polydicarbon monofluoride.

7. A method of producing an optical recording medium comprising the steps of:
sputtering a polymeric material at a predetermined vacuum condition in an evacuated chamber to thereby form an under layer of said sputtered material on an uneven surface pattern of prepits and pregrooves formed on one surface of a transparent substrate; and
forming a recording layer on said under layer in said evacuated chamber continuously after the forming of said under layer
wherein the polymeric material can be melted, sublimated, or decomposed at a temperature lower than that of said recording layer, and whereby said under layer relaxes thermal shock transmitted from said recording layer to said substrate.

8. The method of claim 7, wherein said polymeric material is selected from at least one member of the group consisting of fluorocarbon polymers, polyamide and polyamideimide.

9. The method of claim 8, wherein said polymeric material is a polymer selected from at least one member of the group consisting of polyolefin fluoride, halogenide of polyolefin fluoride, and graphite fluoride.

10. The method of claim 7, wherein said under layer of polymeric material is formed by a radio frequency sputtering method.

11. The method of claim 10, wherein said recording layer is formed by a sputtering method.

12. The method of claim 7, wherein said substrate comprises a plastic resin selected from at least one member of the group consisting of PMMA, PC, polyvinyl chloride, polypropylene, acrylic resin, and epoxy resin.

13. The method of claim 7, wherein said recording layer comprises at least one element selected from the group consisting of S, Se, Te, Bi, Sn, Pb, In, Zn, Mg, Au, Ce, Ca, Sb, Rh, Mn and Al.

14. The method of claim 7, wherein said recording layer comprises a tellurium alloy.

15. The method of claim 7, wherein said high polymeric material is at least one compound selected from the group consisting of polytetrafluoroethylene, polyvinyl fluoride, polytrifluoroethylene, polyvinylidene fluoride, polyhexafluoropropylene, polychlorotrifluoroethylene, polydichlorodifluoroethylene, polycarbon monofluoride and polydicarbon monofluoride.

* * * * *

UNITED STATES PATENT AND TRADEMARK OFFICE
CERTIFICATE OF CORRECTION

PATENT NO. : 5,073,243

DATED : Dec. 17, 1991

INVENTOR(S) : AKIRA GOTOH et al.

It is certified that error appears in the above-identified patent and that said Letters Patent is hereby corrected as shown below:

On the title page, Item [73], please change "Hitachi Maxwell, Ltd" to

--Hitachi Maxell, Ltd--

Signed and Sealed this

First Day of June, 1993

Attest:

MICHAEL K. KIRK

Attesting Officer

Acting Commissioner of Patents and Trademarks